(12) United States Patent
Lee et al.

(10) Patent No.: US 7,874,524 B2
(45) Date of Patent: Jan. 25, 2011

(54) METHODS AND APPARATUS FOR A MULTI-SEGMENT FLAP FENCE

(75) Inventors: Robert Michael Lee, Kirkland, WA (US); Brian G. Evans, Sumner, WA (US)

(73) Assignee: The Boeing Company, Chicago, IL (US)

( * ) Notice: Subject to any disclaimer, the term of this patent is extended or adjusted under 35 U.S.C. 154(b) by 421 days.

(21) Appl. No.: 11/941,780

(22) Filed: Nov. 16, 2007

(65) Prior Publication Data

US 2009/0127404 A1  May 21, 2009

(51) Int. Cl.
*B64C 23/06* (2006.01)
(52) U.S. Cl. .................................. 244/199.4; 244/215
(58) Field of Classification Search .............. 244/199.4, 244/204.1, 200.1, 45 R, 213, 215
See application file for complete search history.

(56) References Cited

U.S. PATENT DOCUMENTS 4,600,172 A * 7/1986 Loth .......................... 244/207
4,712,752 A    12/1987 Victor
5,749,546 A     5/1998 Blackner et al.
7,300,021 B2   11/2007 Voogt

FOREIGN PATENT DOCUMENTS

GB              2051706      *  1/1981
WO PCT US/2008/081472       10/2008

* cited by examiner

*Primary Examiner*—Tien Dinh
*Assistant Examiner*—Michael Kreiner
(74) *Attorney, Agent, or Firm*—Tung & Associates

(57) ABSTRACT

A multi-segment flap fence is incorporated into the wing such that a lower fence structure is attached to the underside of the fixed wing, an upper fence structure is attached to the main flap (e.g., at the outboard end). The two flap segments are configured to slideably articulate with respect to each other when the flap is extended to form a composite flap fence having an area that is substantially equal to the sum of the surface areas of the upper and lower flap fence structures. In one embodiment, the area of the upper fence is less than that of the lower fence.

18 Claims, 3 Drawing Sheets

METHODS AND APPARATUS FOR A MULTI-SEGMENT FLAP FENCE

TECHNICAL FIELD

The embodiments described herein generally relate to wing structures used in connection with aircraft and the like, and more particularly relate to flap fences incorporated into such structures.

BACKGROUND

Aircraft wing structures include fixed members as well as various moving control surfaces such as ailerons, flaps, and the like which, during certain flight conditions, can give rise to drag, vortex noise, and other undesirable effects. For example, when a wing flap is extended relative to the fixed wing structure, a strong vortex is typically generated by the resulting gap between the flap and the wing.

Prior solutions have attempted to address this flap vortex problem by incorporating unitary vertical fence structures into, for example, the outboard flap itself or on the fixed wing structure. Such designs, while moderately effective, are nonetheless undesirable in that, to make them completely close the gap off at a full flap extended position, the fence extends far out into the airflow, thus greatly increasing drag and weight. If the fence is designed to cover only the less-extended flap settings, then a significant gap remains between the flap and wing structure, producing significant vortex noise and reducing lift. Furthermore, increasing the surface of the flap fence can increase the drag produced by the structure during cruise conditions.

Accordingly, it is desirable to provide a flap fence design that reduces vortex noise while not significantly increasing drag. Furthermore, other desirable features and characteristics of the various embodiments will become apparent from the subsequent detailed description and the appended claims, taken in conjunction with the accompanying drawings and the foregoing technical field and background.

BRIEF SUMMARY

Methods and apparatus are provided for an improved flap fence structure. In one embodiment, a multi-segment flap fence is incorporated into the wing such that a lower fence structure is attached to the underside of the fixed wing structure, an upper fence structure is attached to the main flap (e.g., at the outboard end), and the two flap segments are adjacent to each other. The two flap segments are configured to slideably engage when the flap is extended to form a composite flap fence having an area that is substantially equal to the sum of the surface areas of the upper and lower flap fence structures.

BRIEF DESCRIPTION OF THE DRAWINGS

Various embodiments will hereinafter be described in conjunction with the following drawing figures, wherein like numerals denote like elements.

DETAILED DESCRIPTION

Figure 1:
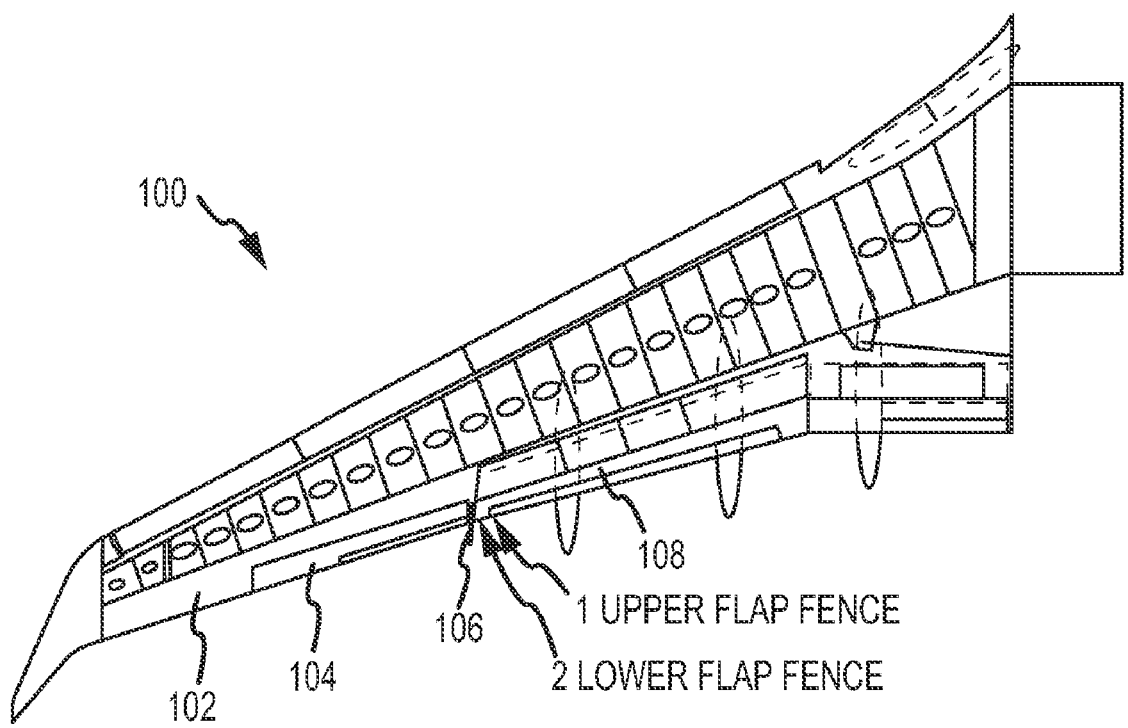
FIG. 1 is a top view of a typical wing structure useful in illustrating the present embodiments.

In general, what is described is a multi-segment (e.g., two-segment) flap fence that better reduces vortex noise while minimizing the introduction of drag during cruise. In this regard, the following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments described herein are, for example, capable of use in sequences other than those illustrated or otherwise described herein. Unless expressly stated otherwise, "connected" means that one element/node/feature is directly joined to (or directly communicates with) another element/node/feature, but not necessarily mechanically. Likewise, unless expressly stated otherwise, "coupled" means that one element/node/feature is directly or indirectly joined to (or directly or indirectly communicates with) another element/node/feature, but not necessarily mechanically.

The terms "comprise," "include," "have" and any variations thereof are used synonymously to denote non-exclusive inclusion. The terms "left," right," "in," "out," "front," "back," "up," "down," and other such directional terms are used to describe relative positions, not necessarily absolute positions in space. The term "exemplary" is used in the sense of "example," rather than "ideal."

In the interest of conciseness, conventional techniques, structures, and principles known by those skilled in the art may not be described herein, including, for example, conventional aircraft structural design, basic principles of aircraft wings, and the like.

Referring now to FIG. 1, a typical wing structure (or simply "wing") 100 useful in describing various embodiments of the invention is shown. It will be appreciated that the particular wing shape illustrated in this and other figures in no way limits the range of wing shapes in which the present embodiments may be implemented. As shown, wing 100 includes a fixed wing structure 102, an aileron 104, and a flap (e.g., an outboard main flap) 108, all of which operate as is known in the art.

In accordance with one embodiment, a multi-segment flap fence (or simply "flap fence" or "fence") 106 is incorporated into wing 100 at the outboard edge of main flap 108 as shown. The present embodiments are not so limited, and may be used in conjunction with any suitable flap.

Figure 2:
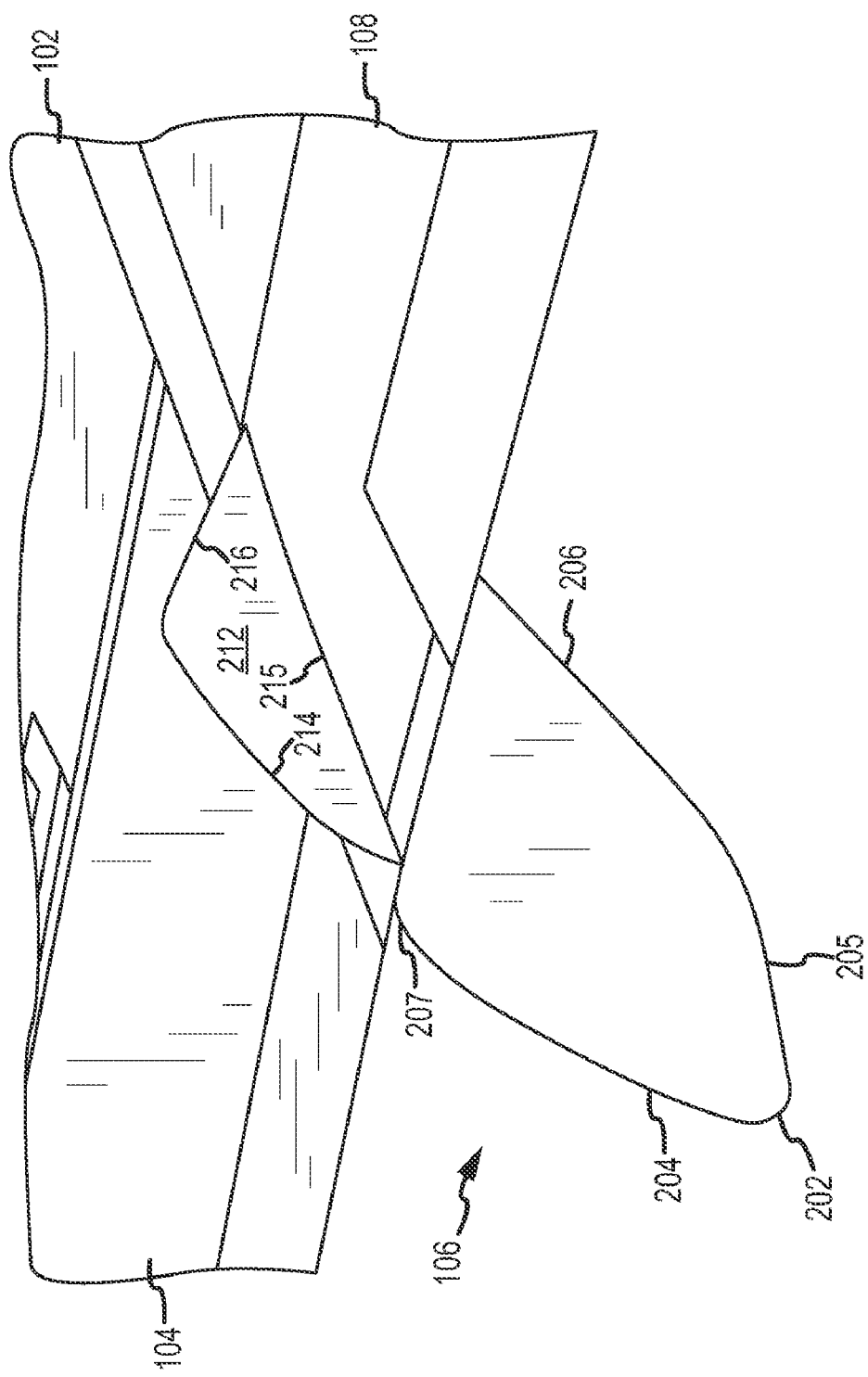
FIG. 2 is an isometric overview of a flap fence structure, in accordance with one embodiment, in an unextended state.
Figure 3:
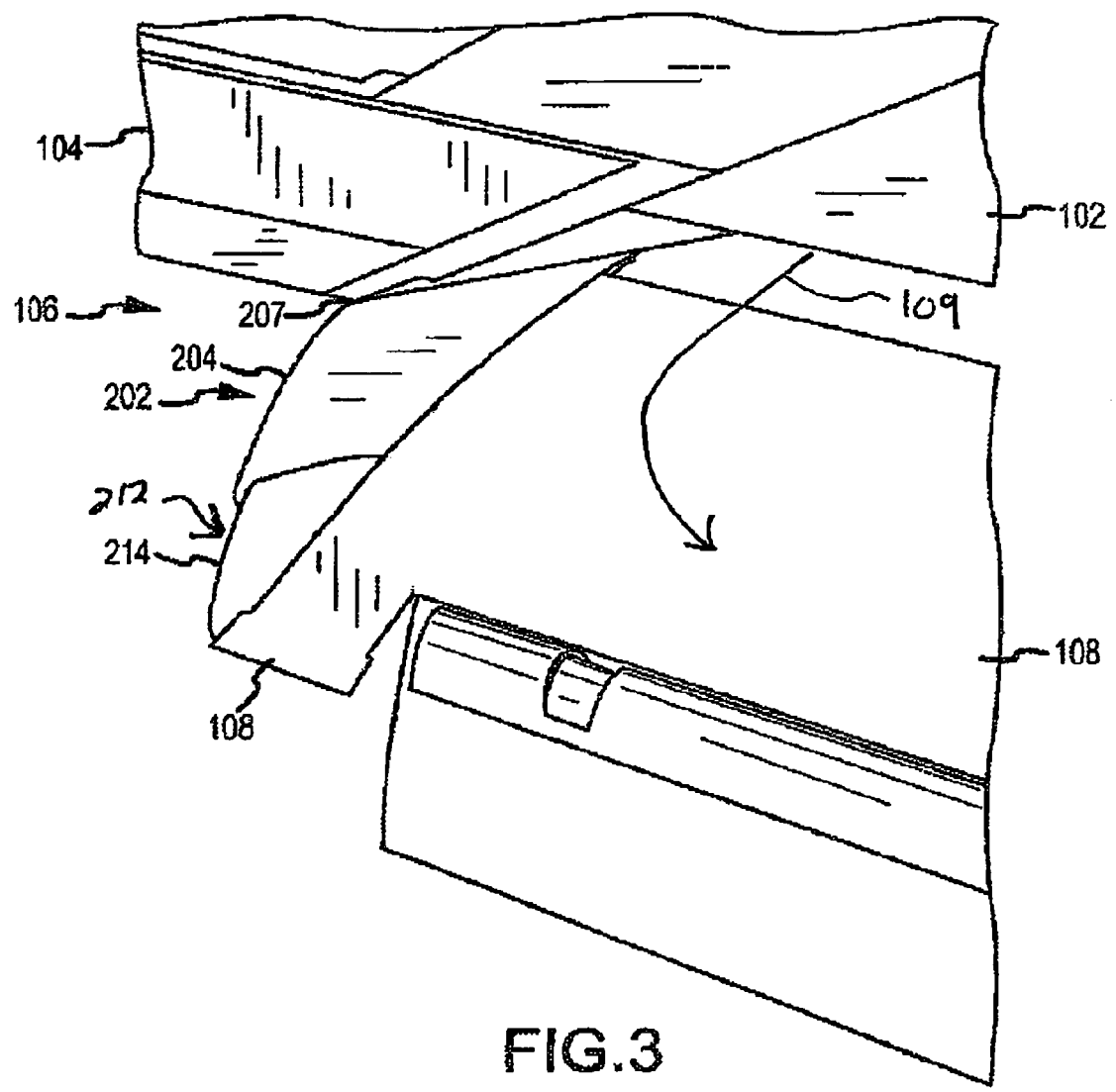
FIG. 3 is an isometric overview of the flap fence structure of FIG. 2 in an extended state.

More particularly, referring to the isometric overviews shown in FIG. 2 and FIG. 3 (retracted and extended states, respectively), multi-segment flap fence 106 generally includes a top flap fence segment (or "top fence") 212, and a bottom flap fence segment (or "bottom fence") 202. Top fence 212 is secured to or integrated into the top surface of outboard edge of main flap 108 and extends therefrom, while lower fence 202 is secured to or integrated into the bottom surface (lower trailing edge) of fixed wing structure 102 (in this embodiment, along the projecting portion of fixed wing structure 102 between flap 108 and aileron 104). Top fence and bottom fence are positioned such that they are adjacent to each other (e.g., offset a predetermined distance along the major axis of the wing), and can slideably articulate with respect to each other when flap 108 is extended. Each falls within a plane that is parallel to the flow field during flight.

When flap 108 is moved to an extended position (such as a 40° setting as shown in FIG. 3) including downward movement of the flap 108 with respect to the fixed wind structure 102 as indicated by arrow 109, top fence 212 slides past bottom fence 202 such that the two fences form a composite fence structure whose total area is substantially equal to (i.e., slightly less than) the sum of individual surface areas of the respective fence segments 212 and 202.

The respective surface areas of top fence 212 and bottom fence 204 may be selected depending upon the nature of the wing, the application, or the like. In one embodiment, top fence 212 has an area that is less than that of lower fence 202. In a particular embodiment, for example, the surface area of top fence 212 is less than half that of bottom fence 202. This ratio, however, depends on each wing/flap design. It is desirable to incorporate a smaller area fence segment on top of the wing because of higher flowfields above the upper wing surface, and the resulting drag penalties.

In the illustrated embodiment, top fence 212 is generally triangular-shaped (its sides or "edges" consisting of 214, 215, and 216) and has rounded corners. Side 215 is suitably attached or integrated into main flap 108 as shown. In contrast, bottom fence 202 is generally a convex quadrilateral (with sides or "edges" 204, 205, 206, 207) with rounded corners, and with side 207 fixed or integrated into fixed wing structure 102.

Upper fence 212 and lower fence 202 may be fabricated from the same or different materials, and may comprise any combination of materials—e.g., aluminum alloys, composites, or the like. Similarly, the thickness and size of these structures may also be selected in accordance with applicable design principles and desired performance.

As shown in FIG. 3, in the illustrated embodiment, edge 204 of bottom fence 202 and edge 214 of top fence 212 (their trailing edges) form a substantially contiguous curvilinear shape when flap 108 is fully extended. That is, when extended, bottom fence 202 and top fence 212 appear as a single composite fence flap unit such that there is no significant gap between outboard main flap 108 and fixed wing structure 102 (i.e., in the lateral directional, orthogonal to the planes defined by the fence segments). In this way, the vortices are reduced in this area, concomitantly reducing flap noise.

In order to minimize noise resulting from gaps between top fence 214 and bottom fence 204, it is desirable for the two segments to be on parallel planes that are offset from each other by a relatively small distance. In another embodiment, when the flap is extended, the two segments make contact during the transition, forming a "wiping seal." In such a case, a friction-reducing layer of Teflon or the like may be coated on one or more of the segments.

By using two fence segments that are smaller than the equivalent combined fence dimensions, the illustrated embodiment protrudes less into the freestream airflow during cruise, and thus produces less drag than would be produced by a single fence having the same total area. Low-speed CFD analysis suggests that the lift/drag of this flap design can be improved by 1% with flaps set at 40°, with a reduction in middle to high frequency noise of 4 to 7 dBs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A multi-segment flap fence for an aircraft wing having a flap, comprising:
    a first fence segment fixed to and extending from a top surface of the flap; and
    a second fence segment fixed to and extending from a bottom surface of a fixed portion of the wing in a direction opposite that of the first fence segment;
    wherein the first fence segment and the second fence segment are configured to slide past each other to comprise a composite fence structure when the flap is in an extended position, said first and second fence segments substantially parallel to one another and a flow field during flight; and
    wherein the first fence structure has a first trailing edge, and the second fence structure has a second trailing edge, wherein the first and second trailing edges are substantially contiguous to approximate the shape of a single fence flap structure having an area that is substantially equal to the sum of the surface area of said first and second fence structures when the flap is in the extended position.

2. The multi-segment flap fence of claim 1, wherein the first fence structure has a surface area that is less than a surface area of the second fence structure.

3. The multi-segment flap fence of claim 2, wherein the surface area of the first fence structure is less than half of the surface area of the second fence structure.

4. The multi-segment flap fence of claim 1, wherein the first fence structure is substantially triangular.

5. The multi-segment flap fence of claim 1, wherein the second fence structure is a convex quadrilateral.

6. The multi-segment flap fence of claim 1, wherein the first and second flap fence segments form a wiping seal as the flap is moved to the extended position.

7. The multi-segment flap fence of claim 1, wherein at least one of the first and second flap fence segments includes a friction-reducing coating.

8. The multi-segment flap fence of claim 1, wherein the first fence segment is fixed to the outboard edge of the flap.

9. An aircraft wing comprising:
    a fixed portion;
    a flap; and
    a flap fence comprising a first fence segment fixed to and extending from a top surface of the flap, and a second fence segment fixed to and extending from a bottom surface of said fixed portion of the wing in a direction opposite that of the first fence segment, wherein the first fence segment and the second fence segment are configured to slide past each other to comprise a composite fence structure when the flap is in an extended position, said first and second fence segments substantially parallel to one another and a flow field during flight; and wherein the first fence structure has a first trailing edge, and the second fence structure has a second trailing edge, wherein the first and second trailing edges are substantially contiguous to approximate the shape of a single fence flap structure having an area that is substantially equal to the sum of the surface area of said first and second fence structures when the flap is in the extended position.

10. The aircraft wing of claim 9, wherein the first fence structure has a surface area that is less than a surface area of the second fence structure.

11. The aircraft wing of claim 9, wherein the first fence structure is substantially triangular, and the second fence structure is a convex quadrilateral.

12. The aircraft wing of claim 9, wherein the first and second flap fence segments form a wiping seal as the flap is moved to the extended position.

13. The aircraft wing of claim 9, wherein the flap is an outboard flap.

14. A method for reducing vortex noise associated with an aircraft wing having a fixed portion and a flap moveably attached to the fixed portion, the method comprising:
   providing a first fence segment;
   providing a second fence segment;
   fixing the first fence segment to a top surface of the flap; and
   fixing the second fence segment to a bottom surface of the fixed portion of the wing in a direction opposite that of the first fence segment such that, when the flap is in an extended position, the first fence segment and the second fence segment slide past each other to comprise a composite fence structure, said first and second fence segments substantially parallel to one another and a flow field during flight; and wherein the first fence structure has a first trailing edge, and the second fence structure has a second trailing edge, wherein the first and second trailing edges are substantially contiguous to approximate the shape of a single fence flag structure having an area that is substantially equal to the sum of the surface area of said first and second fence structures when the flap is in the extended position.

15. The method of claim 14, further including coating at least one of the first fence segment and the second fence segment with a friction-reducing material.

16. The method of claim 14, wherein the step of providing a first fence segment includes providing a substantially triangular first fence segment.

17. The method of claim 14, wherein the step of providing a second fence segment includes providing a convex quadrilateral second fence segment.

18. The method of claim 14, wherein fixing steps are performed such that the composite fence structure is formed when the flap is at approximately a 40° extension to approximate the shape of a single fence flap structure having an area that is substantially equal to the sum of the surface area of said first and second fence structures.

* * * * *